United States Patent
Ohtake et al.

(10) Patent No.: US 7,247,123 B2
(45) Date of Patent: Jul. 24, 2007

(54) SYSTEM AND METHOD OF CONTROLLING IDLE-STOP VEHICLE

(75) Inventors: Isamu Ohtake, Shizuoka (JP); Yoshiaki Katou, Kanagawa (JP)

(73) Assignee: Jatco, Ltd, Shizuoka (JP)

(*) Notice: Subject to any disclaimer, the term of this patent is extended or adjusted under 35 U.S.C. 154(b) by 218 days.

(21) Appl. No.: 11/174,609

(22) Filed: Jul. 6, 2005

(65) Prior Publication Data
US 2006/0009325 A1    Jan. 12, 2006

(30) Foreign Application Priority Data
Jul. 9, 2004    (JP) .............................. 2004-203450

(51) Int. Cl.
F16H 59/00 (2006.01)
B60W 10/02 (2006.01)
B60W 10/04 (2006.01)

(52) U.S. Cl. ......................................... 477/98; 477/181
(58) Field of Classification Search .................. 477/98, 477/180, 181; 701/67, 68
See application file for complete search history.

(56) References Cited

U.S. PATENT DOCUMENTS

| | | | |
|---|---|---|---|
| 6,123,645 A * | 9/2000 | Hopper | 477/164 |
| 6,881,167 B2 * | 4/2005 | Inada | 475/5 |
| 2006/0184304 A1 * | 8/2006 | Katou et al. | 701/54 |
| 2006/0189436 A1 * | 8/2006 | Nakashima et al. | 477/174 |
| 2006/0194672 A1 * | 8/2006 | Ochi et al. | 477/76 |

FOREIGN PATENT DOCUMENTS

JP    2003-227565 A    8/2003

* cited by examiner

Primary Examiner—Tisha Lewis
(74) Attorney, Agent, or Firm—Foley & Lardner LLP

(57) ABSTRACT

A system for controlling an idle-stop vehicle includes an ECU which carries out idle stop when the idle-stop permission conditions are established, and engine restart and engagement of a forward clutch when the idle-stop release conditions are established after engine stop. The ECU is so programmed as to estimate a heat generation amount of the forward clutch at engine restart after idle stop, permit next idle stop when the heat generation amount is smaller than a first set value, permit next idle stop, after a lapse of a predetermined time, when the heat generation amount is equal to or greater than the first set value and equal to or smaller than a second set value which is greater than the first set value, and prohibit next idle stop when the heat generation amount is greater than the second set value.

10 Claims, 7 Drawing Sheets

SYSTEM AND METHOD OF CONTROLLING IDLE-STOP VEHICLE

BACKGROUND OF THE INVENTION

The present invention relates to a system and method of controlling an idle-top vehicle, and more particularly, to a technique of enhancing the durability of a start clutch.

There is a system for controlling an idle-stop vehicle, which is so constructed as to include an engine-driven oil pump only and exclude an electric pump and the like. Due to absence of a hydraulic source, the start clutch is released during idle stop. And at engine restart after idle stop, the start clutch is subjected to slip control, achieving smooth start of the vehicle.

SUMMARY OF THE INVENTION

With the above system, however, the start clutch is released during idle stop, so that the start-clutch engagement frequency predicted in a vehicle warranty period significantly increases as compared with the vehicle having no idle-stop control or the vehicle in which the start clutch is not released during idle-stop control. Moreover, at engine restart, the start clutch always experiences slippage, requiring application of a clutch facing which allows great enhancement in clutch life and strength and/or countermeasures for improving a lubrication environment, leading to increase in manufacturing cost.

It is, therefore, an object of the present invention to provide a system and method of controlling an idle-stop vehicle, which can secure the heat resisting performance of the start clutch even if the start clutch is released during idle stop.

Generally, the present invention provides a system for controlling an idle-stop vehicle, which comprises: a hydraulic source; a forward clutch which is engaged through the hydraulic source; and an electronic control unit (ECU) which carries out an idle stop for stopping an engine when idle-stop permission conditions are established, the ECU carrying out an engine restart and an engagement of the forward clutch when idle-stop release conditions are established after an engine stop, the ECU being so programmed as to: estimate a heat generation amount of the forward clutch at the engine restart after the idle stop, permit a next idle stop when the heat generation amount is smaller than a first set value, permit the next idle stop, after a lapse of a predetermined time, when the heat generation amount is equal to or greater than the first set value and equal to or smaller than a second set value which is greater than the first set value, and prohibit the next idle stop when the heat generation amount is greater than the second set value.

One aspect of the present invention lies in providing a method of controlling an idle-stop vehicle with a hydraulic source and a forward clutch which is engaged through the hydraulic source, wherein the method comprises: carrying out an idle stop for stopping an engine when idle-stop permission conditions are established; carrying out an engine restart and an engagement of the forward clutch when idle-stop release conditions are established after an engine stop; estimating a heat generation amount of the forward clutch at the engine restart after the idle stop; permitting a next idle stop when the heat generation amount is smaller than a first set value; permitting the next idle stop, after a lapse of a predetermined time, when the heat generation amount is equal to or greater than the first set value and equal to or smaller than a second set value which is greater than the first set value; and prohibiting the next idle stop when the heat generation amount is greater than the second set value.

BRIEF DESCRIPTION OF THE DRAWINGS

The other object and features of the present invention will become apparent from the following description with reference to the accompanying drawings, wherein.

DETAILED DESCRIPTION OF THE INVENTION

Referring to the drawings, a description will be made about the best mode for realizing a system for controlling an idle-stop vehicle according to the present invention.

Figure 1:
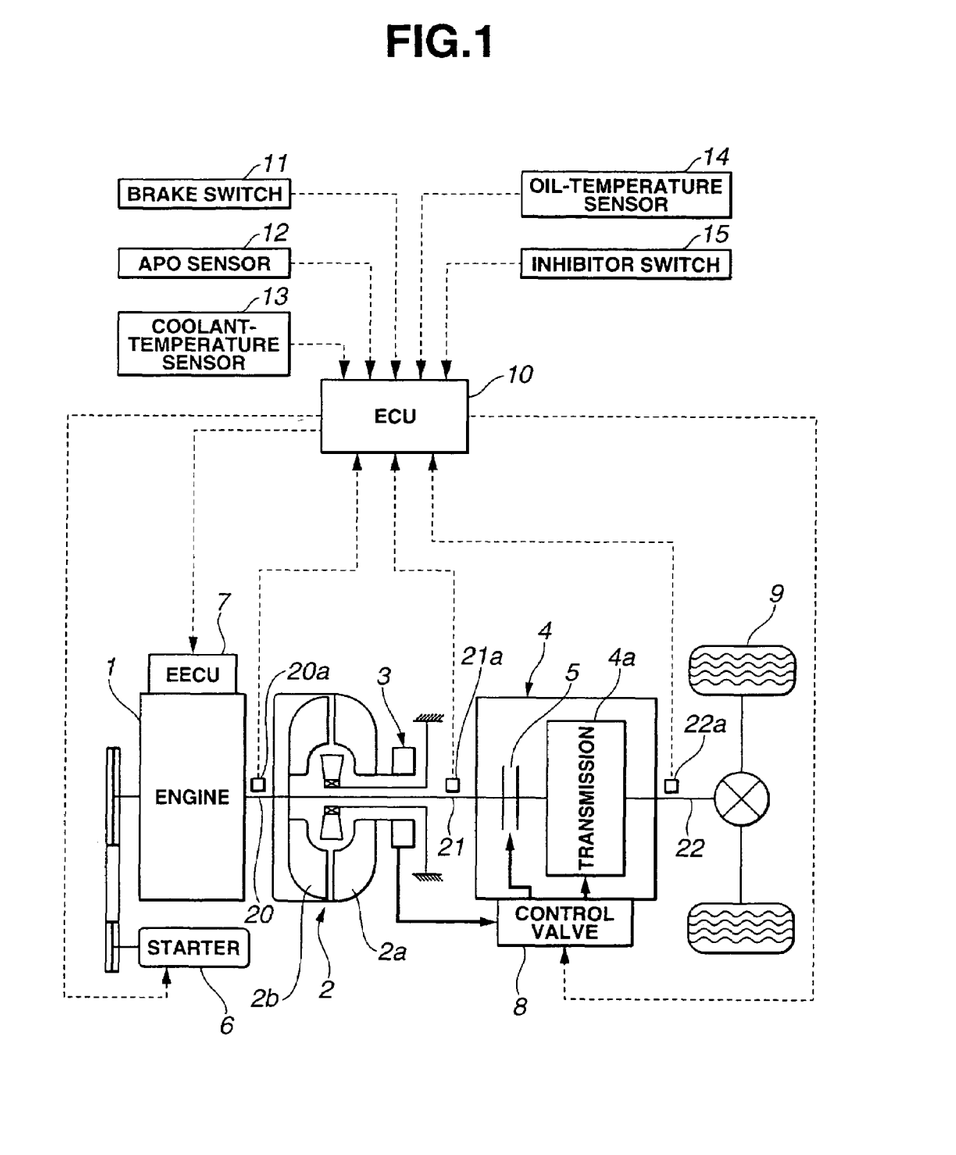
FIG. 1 is a schematic view showing a general structure of an idle-stop vehicle in a first embodiment.

FIGS. 1-6 show first embodiment of the present invention. Referring to FIG. 1, the idle-stop vehicle comprises an engine 1 provided with a starter motor 6 for carrying out engine start and an engine electronic control unit (EECU) 7 for controlling the engine driving state. Engine torque provided from an engine output shaft 20 serves to drive a pump impeller 2a of a torque converter 2 and an oil pump 3. Torque of the pump impeller 2a is amplified, which is transmitted to a turbine runner 2b.

Torque of the turbine runner 2b is input from a turbine shaft 21 to a forward clutch 5 arranged in an automatic transmission 4 and engaged at forward cruising. Torque transmitted through the forward clutch 5 is changed by a transmission 4a for achieving a desired conversion ratio, which is transmitted to driving wheels 9 through a transmission output shaft 22. A control valve 6 is arranged in the automatic transmission 4 to carries out, through an oil pump 3 as a hydraulic source, hydraulic engagement control of the forward clutch 8 and change-speed hydraulic control of the transmission unit 4a. The transmission 4a may be either a belt continuously variable transmission (CVT) or a gear automatic transmission.

An electronic control unit (ECU) 10 receives rotating-speed signals of rotating elements such as an engine-speed sensor 20a for sensing an engine speed Ne (rotating speed of the engine output shaft 20), turbine-speed sensor 21a for sensing a turbine speed Nt (rotating speed of the turbine shaft 21), and a vehicle-velocity sensor 22a for sensing a rotating speed of the transmission output shaft 22. Moreover, the ECU 10 receives signals of a brake switch 11, an accelerator-pedal-opening (APO) sensor 12, a coolant-temperature sensor 13, an oil-temperature sensor 14 for sensing an oil temperature in the automatic transmission 4, and an inhibitor switch 15 for detecting a position of a select lever operated by a driver. In addition, the ECU 10 may receive signals of a master-cylinder-pressure sensor, a steering-angle sensor, a winker, and the like.

In accordance with the signals of the sensors and switches, the ECU 10 determines whether or not the idle-stop permission conditions are established, and the idle-stop release conditions are established, providing an after-mentioned idle-stop permission signal and idle-stop release signal to the EECU 7 and a control signal to the starter motor 6 and the control valve 8.

Idle-stop permission conditions: In a specific example of the idle-stop permission conditions, idle stop is permitted when the following conditions are all established:
1. The brake switch is turned on,
2. The accelerator pedal opening is zero,
3. The vehicle velocity is equal to or smaller than a predetermined value,
4. The engine coolant temperature is within a predetermined range,
5. The oil temperature in the automatic transmission is within a predetermined range, and
6. The automatic transmission is placed in any one of the drive range, neutral range, and parking range.

In addition, other requirements may be included in the above conditions.

Idle-stop release conditions: Idle stop is released when the following conditions are all established during idle stop:
1. The brake switch is turned off, and
2. The totalized charge amount of the battery is equal to or greater than a predetermined value.

In addition, other requirements may be included in the above conditions.

Figure 2:
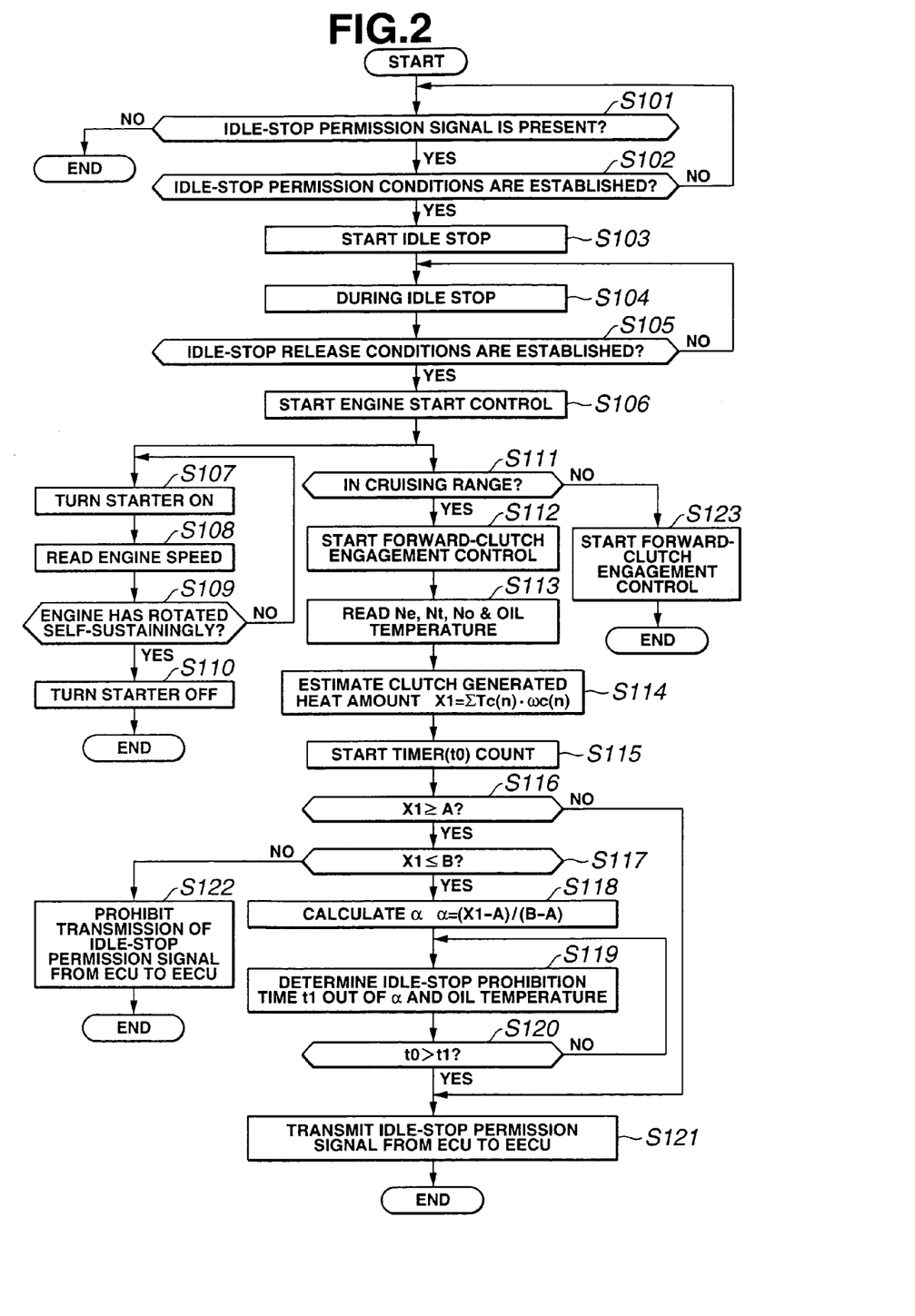
FIG. 2 is a flowchart showing operation of the first embodiment.

Referring to FIG. 2, idle-stop control processing in the first embodiment will be described. At a step S101, it is determined whether or not an idle-stop permission signal is transmitted. If answer is YES, flow proceeds to a step S102, whereas if answer is NO, flow comes to an end. At the step S102, it is determined whether or not the idle-stop permission conditions are established. If answer is YES, flow proceeds to a step S103, whereas answer is NO, flow returns to the step S101. At the step S103, an idle-stop signal is provided. At a step S104, idle stop of the engine 1 is maintained. At a step S105, it is determined whether or not the idle-stop release conditions are established. If answer is YES, flow proceeds to a step S106, whereas if answer is NO, flow returns to the step S104 to maintain idle stop.

Engine restart processing: At a step S106, the EECU 7 starts engine start control. At a step S107, the starter motor 6 is turned on. At a step S108, the engine speed Ne is read. At a step S109, it is determined whether or not the engine 1 has rotates self-sustainingly. If answer is YES, flow proceeds to a step S110, whereas if answer is NO, flow returns to the step S107 to maintain turn-on of the starter motor 6. At the step S110, the starter motor 6 is tuned off.

At a step S111, it is determined whether or not a signal of the inhibitor switch 15 is in the drive range. If answer is YES, flow proceeds to a step S112, whereas if answer is NO, flow proceeds to a step S123 where forward-clutch engagement control is started, then flow comes to an end. At the step. S112, forward-clutch engagement control is started.

Forward-clutch heat generation amount estimation processing: At a step S113, read are the engine speed Ne, turbine speed Nt, and value No obtained by dividing the output-shaft rotational speed by the conversion ratio of the transmission 4a, and oil temperature in the automatic transmission 4. At a step S114, a heat generation amount X1 of the forward clutch 5 is estimated.

Idle-stop permission signal output determination processing: At a step S115, count of a timer to is started. At a step S116, it is determined whether or not the heat generation amount X1 is equal to or greater than a first set value A. If answer is YES, flow proceeds to a step S117, whereas answer is NO, flow proceeds to a step S121. At the step S117, it is determined whether or not the heat generation amount X1 is equal to or smaller than a second set value B which is larger than the first set value A. If answer is YES, flow proceeds to a step S118, whereas if answer is NO, flow proceeds to a step S122 where transmission of an idle-stop permission signal from the ECU 10 to the EECU 7 is prohibited. At the step S118, a calculation parameter a of an idle-stop prohibition time t1 is calculated. At a step S119, the idle-stop prohibition time t1 is calculated out of the calculation parameter a and the oil temperature in the automatic transmission 4. At a step S120, it is determined whether or not a timer count value exceeds the idle-stop prohibition time t1. If answer is YES, flow proceeds to a step S121, whereas if answer is NO, flow returns to the step S119. At the step S121, an idle-stop permission signal is transmitted from the ECU 10 to the EECU 7.

The idle-stop control processing will be described in detail. In idle-stop control in the first embodiment, it is determined whether or not an idle-stop permission signal is provided in addition to the idle-stop permission conditions. If no idle-stop permission signal is provided out of the ECU 10, idle stop is not carried out even if the idle-stop permission conditions are met.

At engine start caused by driver s key operation, idle-stop control is started with an idle-stop permission signal transmitted. Setting of transmission of an idle-stop permission signal or prohibition of transmission is carried out at engine restart after idle stop. When the idle-stop release conditions are established, the starter motor 6 is turned on to restart the engine 1. At the same time, engagement control of the forward clutch 5 is started. In the first embodiment, the idle-stop vehicle does not include an electric pump serving as a hydraulic source during idle stop, but only oil pump 3 driven by the engine 1. Therefore, when the engine 1 stops, the hydraulic source disappears, putting the forward clutch 5 in the released state.

At engine restart and when the drive range is selected, the vehicle cannot start without engaging the forward clutch 5 by the hydraulic pressure produced by the oil pump 3. When the transmission 4a includes a belt CVD transmission, unless the primary and secondary pulleys are supplied with sufficient hydraulic pressure to secure a belt cramp force, torque input from the forward clutch 5 is not preferable since it may cause belt slippage. When the transmission 4a includes a gear automatic transmission, abrupt engagement of the forward clutch 5 is not preferable since it may cause start shock. Even when the neutral or parking range is selected, engagement of the forward clutch 5 in one stroke may cause an engagement shock.

For the above reason, in engagement control for controlling supply of the engagement pressure of the forward clutch 5, at vehicle start, slip control of the forward clutch 5 is carried out. And at the stage that the discharge pressure of the oil pump 3 is secured, and an inertia energy of the vehicle body is alleviated (i.e. the vehicle moves for some distance), the forward clutch 5 is put in the fully engaged state.

Heat generation amount estimation logic: Next, a description will be made about the estimation logic of the heat generation amount of the forward clutch 5, which is carried out at the step S114. When idle stop is released, and engagement control of the forward clutch 5 is started, the heat generation amount X1 is computed until the forward clutch 5 is fully engaged.

Figure 3:
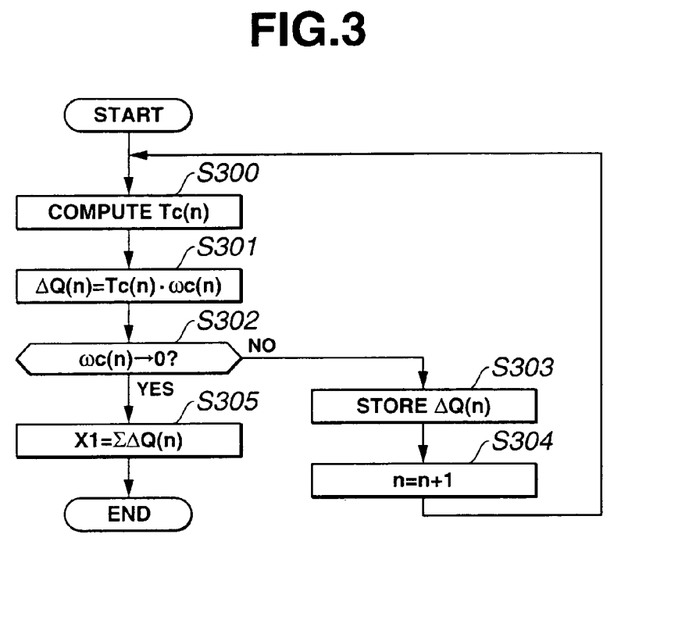
FIG. 3 is a chart similar to FIG. 2, showing operation of the first embodiment.

Referring to FIG. 3, computing of the heat generation amount X1 is started simultaneously with start of clutch engagement control. At a step S300, a forward-clutch torque Tc(n) in a control cycle (n) is computed. At a step S301, an instantaneous heat generation amount ΔQ(n) in the control cycle (n) is computed in accordance with the equation:

$$\Delta Q(n) = Tc(n) \cdot \omega c(n), \text{ where } \omega c(n) \text{ is a slip angular velocity}$$

At a step S302, it is determined whether or not the slip angular velocity ωc(n) in the control cycle (n) converges at zero. If answer is NO, flow proceeds to a step S303, whereas answer is YES, flow proceeds to a step S305. At the step S303, the instantaneous heat generation amount ΔQ(n) is stored. At a step S304, the control cycle (n) is counted. At the step S305, the instantaneous heat generation amount ΔQ(n) is totaled to calculate the heat generation amount X1 (X1=ΣΔQ(n)).

The computing of the heat generation amount X1 will be described.

Figure 4:
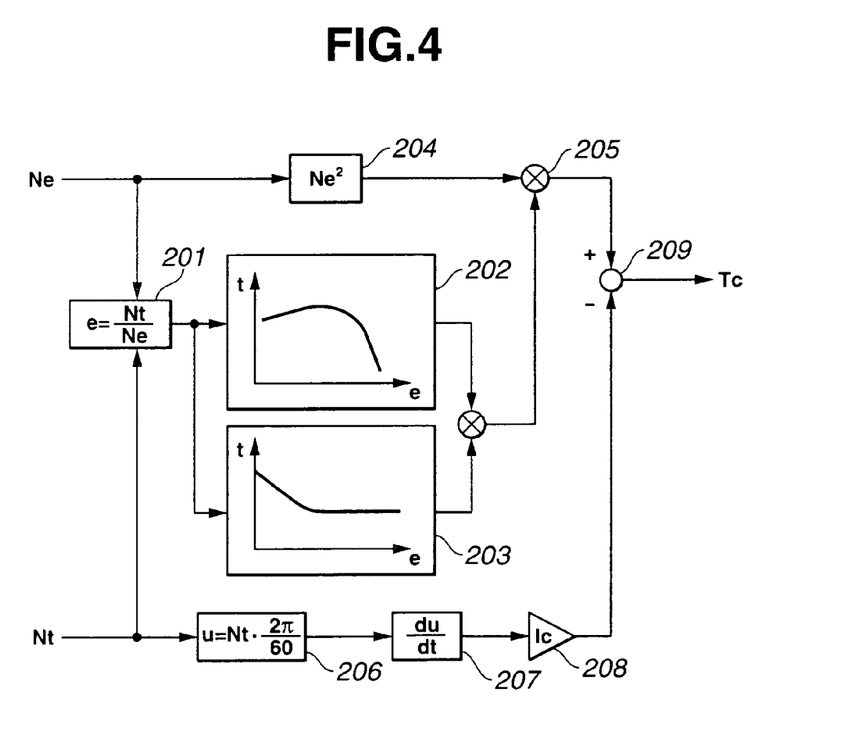
FIG. 4 is a block diagram showing a clutch-torque estimation logic in the first embodiment.

Forward-clutch torque computing: FIG. 4 shows a torque estimation logic of the forward clutch 5 during engagement control at the step S300. A block 201 computes a ratio (speed ratio e) of the turbine speed Nt to the engine speed Ne. A block 202 computes a torque capacity T corresponding to the speed ratio e based on a preset torque-capacity map. A block 203 computes a torque ratio t corresponding to the speed ratio e based on a present torque-ratio map. A block 204 squares the engine speed Ne. A block 205 computes output torque of the torque converter 2 (turbine torque Tt) based on values computed by the blocks 202, 203, and 204.

A block 206 converts the turbine speed Nt expressed in minute unit into a rotation angular velocity u expressed in second unit. A block 207 differentiates the rotation angular velocity u to compute a rotation angular acceleration du/dt. A block 208 computes an inertia torque Ti out of the inertia of the turbine shaft 21 and the rotation angular acceleration du/dt. A block 209 computes a difference between the turbine torque Tt and the inertia torque Ti to compute a clutch torque Tc.

Specifically, the turbine torque Tt of the turbine shaft 21 is computed out of the engine speed Ne and turbine speed Nt, and the torque capacity τ and torque ratio t which are preset torque-converter characteristics. Note that the torque ratio t represents a ratio $(Tt/T_{Ne})$ of the turbine torque Tt to an engine torque $T_{Ne}$, and the torque capacity τ represents a degree of difficulty $(T_{Ne}/(Ne)^2)$ of rotating the engine output shaft 20. The torque ratio t and torque capacity τ are determined based on the design specifications of the torque converter 2 and the speed ratio e. Therefore, from the above relationship, the turbine torque Tt is given by the equation:

$$Tt = t \cdot T_{Ne} = t \cdot T \cdot Ne^2$$

At that time, the inertial torque Ti required to rotate the turbine shaft 21 itself in the fully released state of the forward clutch 5 is used as torque for rotating the turbine shaft 21 without being transmitted through the forward clutch 5. Thus, the engagement torque Tc of the forward clutch 5 (torque transmitted through the forward clutch 5) is given by the equation:

$$Tc = Tt \cdot Ti$$

Instantaneous heat generation amount ΔQ computing: In the forward clutch 5, the drive-side rotating speed is equal to the turbine speed Nt, whereas the driven-side rotating speed is equal to the rotating speed No obtained by dividing the rotating speed of the transmission output shaft 22 by the conversion ratio of the transmission 4a. The slip angular velocity ωc produced between the drive and driven sides of the forward clutch 5 is given by the equation:

$$\omega c = 2\pi/60 \cdot (Nt \cdot No)$$

When engagement of the forward clutch 5 starts, a value of the slip angular velocity ωc increases once, then decreases gradually. And when the forward clutch 5 finally falls in the fully engaged state, the slip angular velocity ωc comes to zero.

In an optional state (n) during engagement control, the instantaneous heat generation amount ΔQ(n) occurring in the forward clutch 5 at the instant (n) is given by the equation:

$$\Delta Q(n) = Tc(n) \cdot \omega c(n), \text{ where n is cycle number after starting engagement control}$$

Therefore, after starting engagement control, the instantaneous heat generation amount ΔQ(n) is computed every control cycle. And after completing engagement control, i.e. at the stage that the forward clutch 5 falls in the fully engaged state, ΔQ(n)(n=1 to n) is totaled to calculate the heat generation amount X1 occurring in the forward clutch 5 at engine restart after idle stop.

Idle-stop permission signal output determination processing: Next, a description will be made about output determination processing of an idle-stop permission signal carried out at the steps S115-S121.

Figure 5:
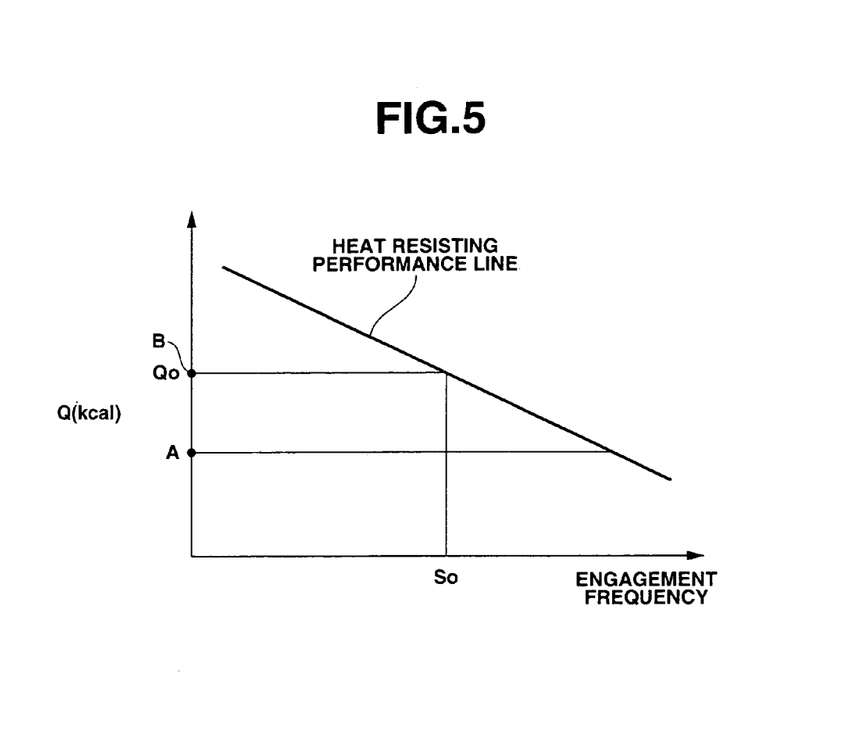
FIG. 5 is a graph showing the relationship between heat generation amount and heat resisting performance in the first embodiment.

First set value A and second set value B: FIG. 5 shows a relationship between the heat generation amount of the forward clutch 5 set for one engagement control and the engagement frequency (heat resisting performance) up to which the performance of the forward clutch 5 is secured when repeatedly carry out the engagement control. Note that the engagement frequency is represented in logarithm. Lower heat generation amount X1 during engagement control shows that the heat resisting performance is excellent.

Referring to FIG. 5, So represents expected engagement frequency occurring within the vehicle warranty period or the vehicle warranty cruising distance. As is seen from FIG. 5, if the heat generation amount X1 is smaller than a given value Qo, the heat resisting performance of the forward clutch 5 can be secured with respect to the expected engagement frequency So. Moreover, if the heat generation amount X1 is smaller than the first set value A, the heat resisting performance of the forward clutch 5 can be secured with respect to the engagement frequency sufficiently greater than the expected engagement frequency So. Note that the relationship between the heat generation amount X1 and the heat resisting performance is calculated under the worst conditions of the elements involving heat generation of the forward clutch 5, such as variation in clutch clearance and facing μ, variation of the hydraulic control solenoid, variation of the clutch return spring, variation in dish-plate stroke, and variation of the orifice system in the engagement-pressure supply hydraulic passage.

As will be described later in detail, the heat resisting performance depends on the idle-stop time. However, if the heat generation amount X1 is smaller than the first set value A, the heat resisting performance can be secured even if idle stop is repeatedly carried out with variations in characteristics involving heat generation being present. Then, an idle-stop permission signal is output.

Moreover, the heat resisting performance depends on the oil temperature. Specifically, the heat generation amount X1 strictly means a heat generation amount occurring due to engagement control, and the amount of heat of the clutch plates themselves of the forward clutch 5 depends on the oil temperature.

If the idle-stop time is longer, the time required for cooling the forward clutch 5 can be secured. However, if the idle-stop time is shorter, the amount of heat of the clutch plates themselves cannot be reduced, so that even if the heat resisting performance can be secured in terms of the heat generation amount, the amount of heat stored in the clutch plates is greater.

When the heat generation amount X1 is smaller, the amount of heat of the clutch plates themselves raises no particular problem. However, when the heat generation amount X1 is greater than the second set value B which is roughly equal to the given value Qo, the amount of heat stored in the clutch plates themselves becomes greater, leading to possible degradation of the heat resisting performance. Thus, when the heat generation amount X1 is greater than the second set value B, transmission of an idle-stop permission signal is prohibited to prohibit next idle stop. With this, the engagement frequency can be reduced to secure the heat resisting performance of the forward clutch 5.

When the heat generation amount X1 is equal to or greater than the first set value A and equal to or smaller than the second set value B, output of an idle-stop permission signal is prohibited for a predetermined time (idle-stop prohibition time t1) in view of securing the time required for cooling the clutch plates of the forward clutch 5. At that time, the idle-stop prohibition time t1 is set based on in which position the heat generation amount X1 is situated in the relationship between the first and second set values A, B. Specifically, a prohibition-time coefficient α is calculated in accordance with the equation:

$$\alpha=(X1A)/(BA)$$

The prohibition-time coefficient α represents a degree of excess of the heat generation amount X1 over the first set value A at which a reduction in heat resisting performance may not occur, and a degree of allowance of the heat generation amount X1 with respect to the second set value B.

Figure 6:
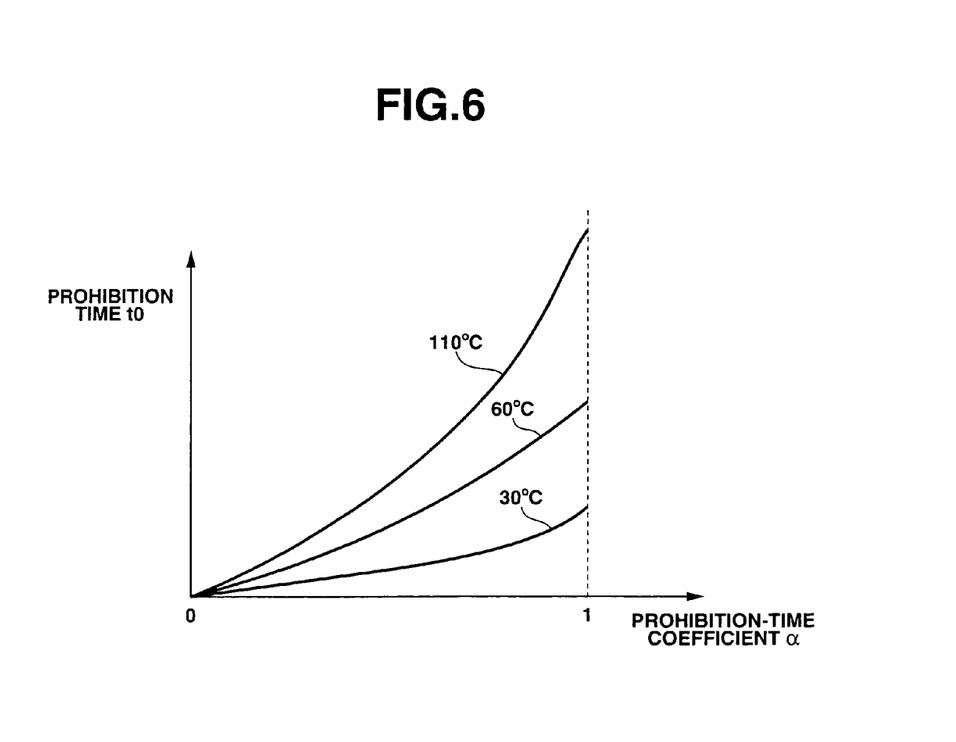
FIG. 6 is a map showing the relationship between prohibition-time coefficient and idle-stop prohibition time in the first embodiment.

FIG. 6 shows a relationship between the prohibition-time coefficient α and the idle-stop prohibition time t1. As described above, since the cooling time differs according to not only the heat generation amount X1, but also the conditions of the oil temperature, the prohibition-time characteristics are set for oil temperatures so that the idle-stop prohibition time t1 is longer as the oil temperature is higher. At the oil temperature other than the oil temperatures shown in FIG. 6, the prohibition-time characteristics can be calculated through linear supplementary computing and the like. Even if the heat generation amount X1 is greater, when the oil temperature is lower, the idle-stop prohibition time t1 is set to be shorter. On the other hand, even if the heat generation amount X1 is smaller, when the oil temperature is higher, the idle-stop prohibition time t1 is set to be longer. With this, the heat resisting performance can be secured while securing the fuel-economy performance due to idle stop.

As described above, the system for controlling an idle-stop vehicle in the first embodiment can produce the following effects:

(1) The heat generation amount X1 of the forward clutch 5 is estimated at engine restart after idle stop. If the heat generation amount X1 is smaller than the first set value A, next idle stop is permitted. If the heat generation amount X1 is equal to or greater than the first set value A and equal to or smaller than the second set value B, next idle stop is permitted after a lapse of predetermined time t0. And if the heat generation amount X1 is greater than the second set value B, next idle stop is prohibited. With this, the heat resisting performance can be secured.

(2) The first set value A is set at a value which is smaller than a variation minimum value of the heat generation amount occurring at least at full-throttle start, and the second set value B is set at given value Qo which ensures the engagement frequency of the forward clutch 5. With this, even if the forward clutch 5 has manufacturing variation and the like, the heat resisting performance can be secured. Moreover, if there is uncertainty about heat resisting performance, idle stop is prohibited to allow reduction in engagement frequency. In the first embodiment, the second set value B is set at the same value as the given value Qo. Optionally, the second set value B may be set at a value larger than the given value Qo. The reason is that setting of the idle-stop prohibition time t1 allows the cooling time to be secured, and thus the heating resisting performance can be enhanced as compared with when setting no idle-stop prohibition time t1. With this, idle stop can be carried out positively, resulting in enhancement in fuel economy.

(3) The idle-stop prohibition time t1 is determined based on a ratio of a difference between the heat generation amount X1 and the first set value A to a difference between the first set value A and the second set value B. With this, the idle-stop prohibition time t1 can finely be set in accordance with the heat generation time X1, so that the heat resisting performance can be secured while securing the fuel-economy performance due to idle stop.

(4) The idle-stop prohibition time t1 is determined based on the oil temperature. Thus, even if the heat generation amount X1 is greater, when the oil temperature is lower, a reduction of the idle-stop prohibition time t1 allows the fuel-economy performance to be secured due to idle stop. Moreover, even if the heat generation amount X1 is smaller, when the oil temperature is higher, an increase of the idle-stop prohibition time t1 allows the heat resisting performance to be secured.

(5) The heat generation amount X1 is estimated based on the engine speed Ne, turbine speed Nt, and output-shaft rotating speed No, resulting in possible accurate estimation without arranging any additional sensor and the like.

Figure 7:
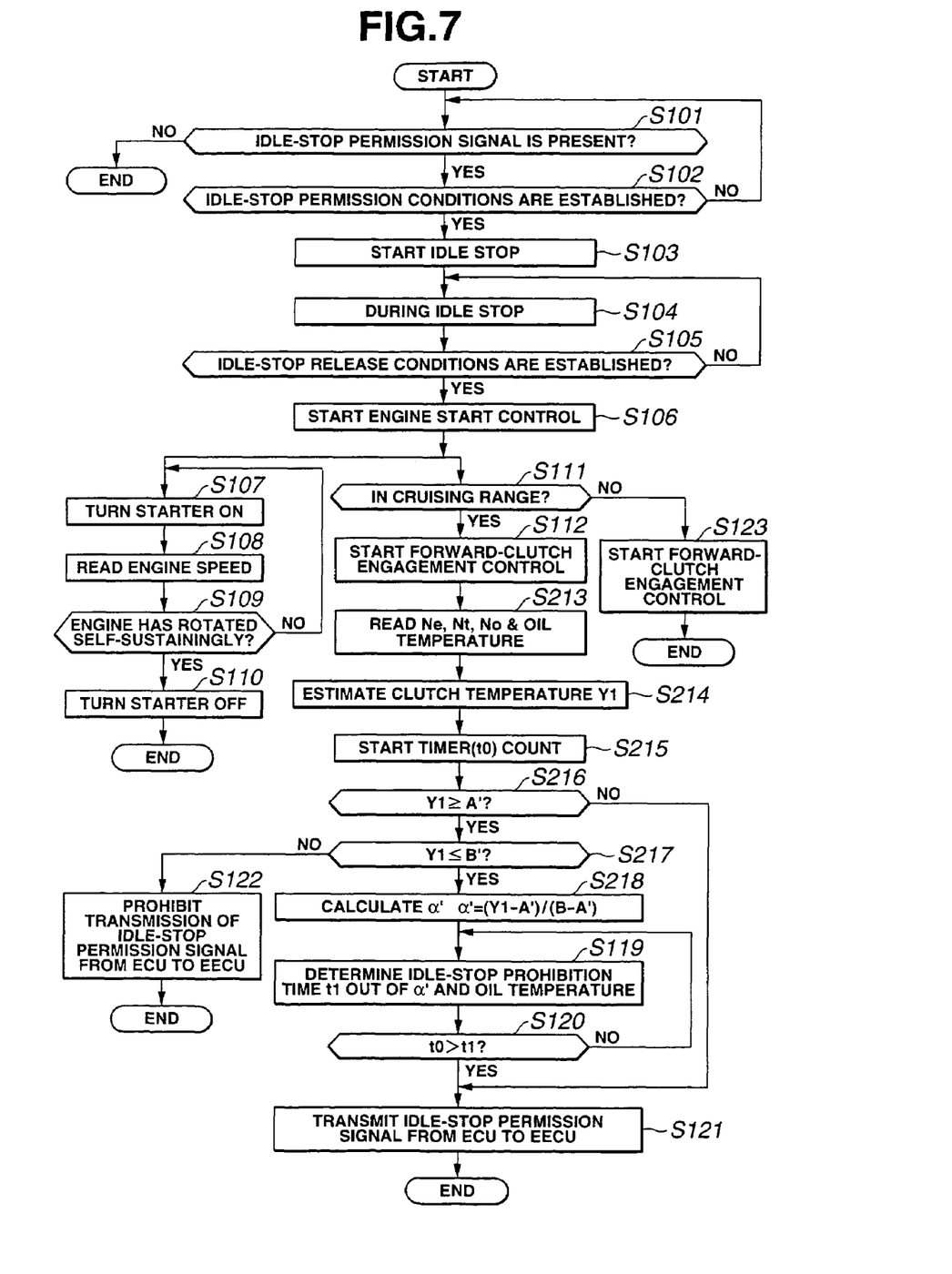
FIG. 7 is a chart similar to FIG. 3, showing operation of a second embodiment.

FIGS. 7-10 show second embodiment of the present invention which is substantially the same in fundamental structure as the first embodiment. FIG. 7 snows idle-stop control processing in the second embodiment. Since the steps S101-S112 and S119-S123 are the same as those in FIG. 2, only the different steps will be described.

Clutch-temperature estimation processing: At a step S213, read are the engine speed Ne, turbine speed Nt, value No obtained by dividing the output-shaft rotating speed by a conversion ratio of the transmission 4a, and oil temperature in the automatic transmission 4. At a step S214, a temperature Y1 of the forward clutch 5 is estimated.

Idle-stop permission signal output determination processing: At a step S215, count of the timer t0 is started. At a step S216, it is determined whether or not the clutch temperature Y1 is equal to or greater than a first set value A. If answer is YES, flow proceeds to a step S217, whereas if answer is NO, flow proceeds to the step 121. At the step S217, it is determined whether or not the clutch temperature Y1 is equal to or smaller than a second set value A which is greater than the first set value A. If answer is YES, flow proceeds to a step S218, whereas if answer is NO, flow proceeds to the step 122 where transmission of an idle-stop permission signal from the ECU 10 to the EECU 7 is prohibited. At the step S218, a calculation parameter $\alpha'$ of the idle-stop prohibition time t1 is calculated.

Clutch-temperature estimation logic: Next, clutch-temperature estimation logic at the step S214 will be described. When idle stop is released to start engagement control of the forward clutch 5, the clutch temperature Y1 is computed.

Figure 8:
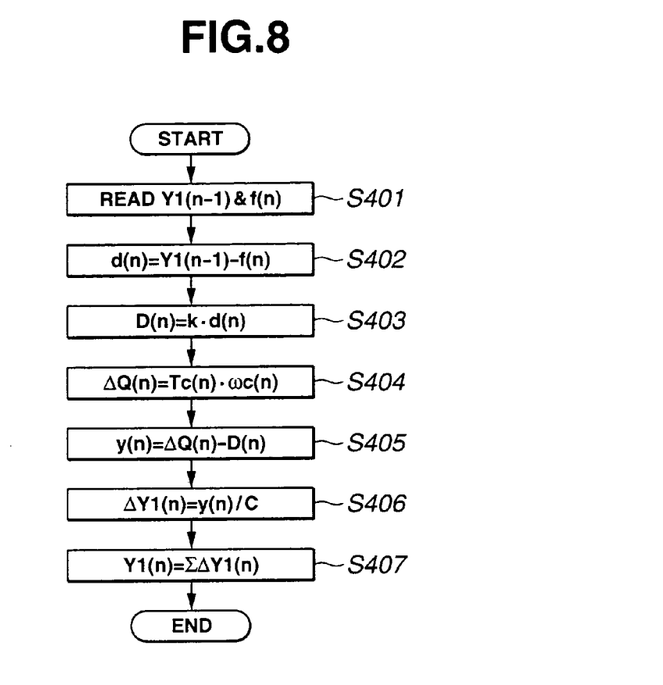
FIG. 8 is a chart similar to FIG. 7, showing operation of the second embodiment.

FIG. 8 shows clutch-temperature Y1 computing. Note that clutch-temperature Y1 computing is carried out at all times. At a step S401, read are a clutch temperature Y1 (n−1) at a previous control cycle (n−1) and an oil temperature f(n) in the automatic transmission 4. At a step S402, a deviation d(n)=Y1 (n−1) f(n) at a current control cycle (n) is computed. At a step S403, a heat radiation amount D(n)=k·d(n) from the forward clutch 5 to oil at the current control cycle (n) is computed. At a step S404, an instantaneous heat generation amount $\Delta Q(n)$ is computed. At a step S405, a heat-amount balance y(n)=$\Delta Q(n)$ D(n) at the current control cycle (n) is computed. At a step S406, a clutch-temperature variation $\Delta Y1(n)$=y(n)/C is computed using a heat capacity C of the forward clutch 5. At a step S407, the clutch-temperature variation $\Delta Y1$ from the control cycle (1) to the control cycle (n) is totaled to compute a clutch-temperature estimation value Y1 (n)=$\Sigma \Delta Y1(n)$.

Figure 9:
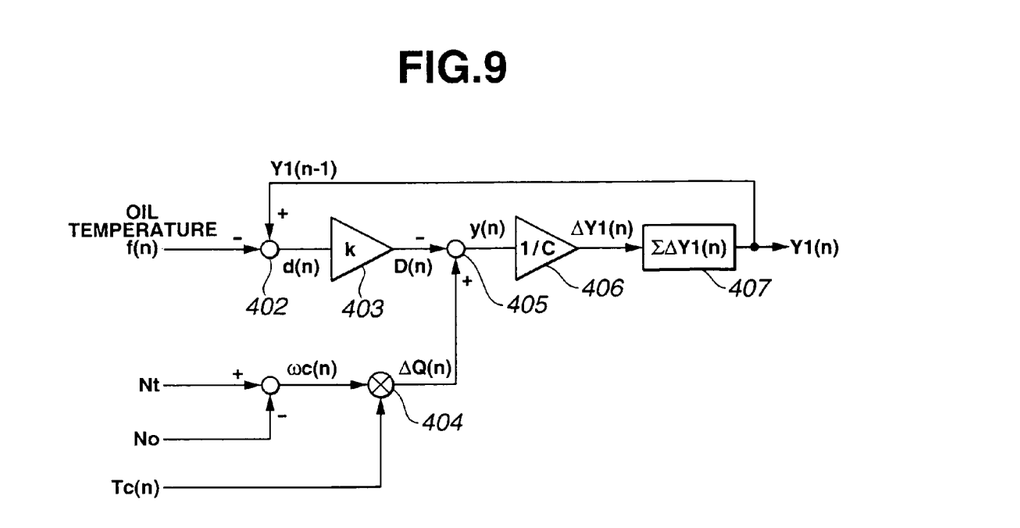
FIG. 9 is a diagram similar to FIG. 4, showing a clutch-temperature estimation logic in the second embodiment.

Referring to FIG. 9, the clutch-temperature Y1 computing will be described. A description about processing at blocks 402-407 is omitted, since the processing corresponds to that at the steps S402-S407 in FIG. 8. As shown in FIG. 9, the blocks 402-407 form a closed-loop system involving the estimated clutch temperature Y1(n). The forward clutch 5 is supplied with oil in the automatic transmission 4 as lubricating oil, whereby heat generated in the forward clutch 5 is dissipated into oil in the automatic transmission 4. Then, a heat radiation gain k is set to compute a heat radiation amount from the forward clutch 5 to oil in the automatic transmission 4 based on a deviation between the clutch temperature Y1 and the oil temperature f(n). And a heat-amount balance between the instantaneous heat generation amount and the instantaneous heat radiation amount is computed out of the instantaneous heat generation amount $\Delta Q$ described in the first embodiment. An instantaneous temperature variation of the forward clutch 5 is estimated out of the heat-amount balance and the heat capacity C of the forward clutch 5, a totaled valued of which is estimated as clutch temperature Y1.

Idle-stop permission signal output determination processing: Next, idle-stop permission signal output determination processing carried out at the steps S215-S121.

Figure 10:
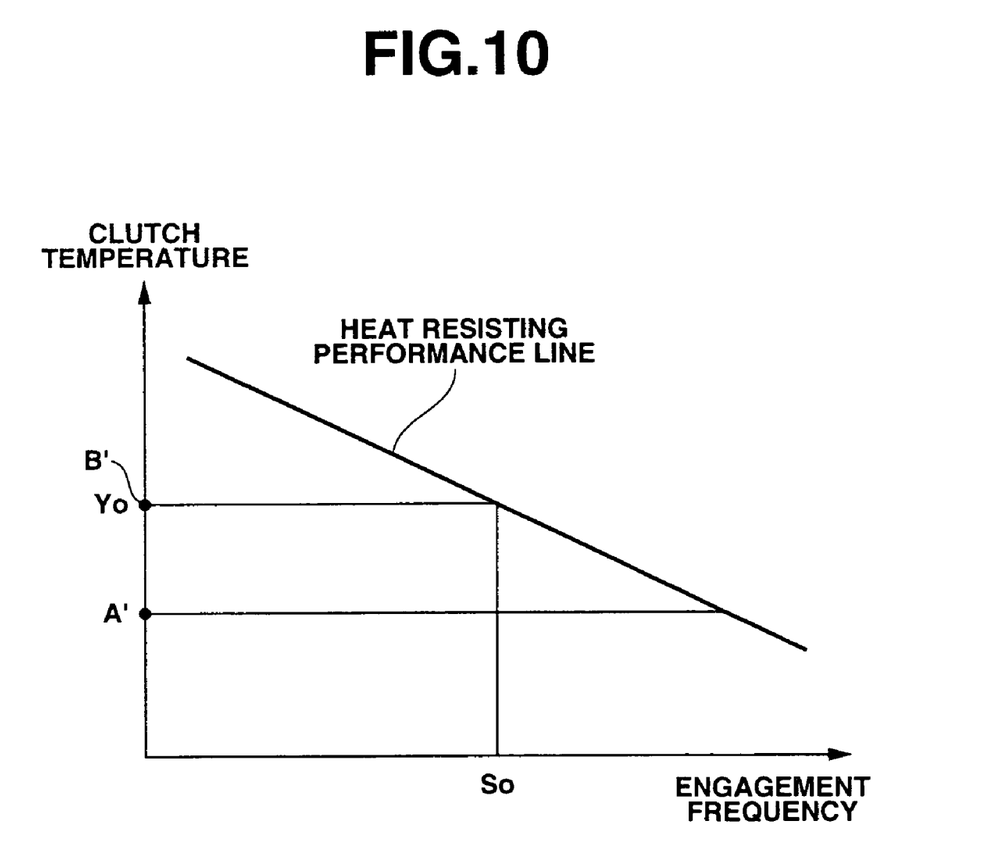
FIG. 10 is a graph similar to FIG. 5, showing the relationship between clutch temperature and heat resisting performance in the second embodiment.

First set value A and second set value B: FIG. 10 shows a relationship between the temperature of the forward clutch 5 set for one engagement control and the engagement frequency (heat resisting performance) up to which the performance of the forward clutch 5 is secured when repeatedly carry out the engagement control. Note that the engagement frequency is represented in logarithm. Lower clutch temperature Y1 during engagement control shows that the heat resisting performance is excellent.

Referring to FIG. 10, So represents expected engagement frequency occurring within the vehicle warranty period or the vehicle warranty cruising distance. As is seen from FIG. 10, if the clutch temperature Y1 is smaller than a given value Yo, the heat resisting performance of the forward clutch 5 can be secured with respect to the expected engagement frequency So. Moreover, if the clutch temperature Y1 is smaller than the first set value A, the heat resisting performance of the forward clutch 5 can be secured with respect to the engagement frequency sufficiently greater than the expected engagement frequency So. Note that the relationship between the clutch temperature Y1 and the heat resisting performance is calculated under the worst conditions of not only the elements involving heat generation of the forward clutch 5, such as variation in clutch clearance and facing μ, variation of the hydraulic control solenoid, variation of the clutch return spring, variation in dish-plate stroke, and variation of the orifice system in the engagement-pressure supply hydraulic passage, but also the heat capacity C and heat radiation gain k.

The heat resisting performance depends on the idle-stop time. However, if the clutch temperature Y1 is smaller than the first set value A, the heat resisting performance can be secured even if idle stop is repeatedly carried out with variations in characteristics involving heat generation being present. Then, an idle-stop permission signal is output.

Moreover, the heat resisting performance depends on the oil temperature. Specifically, as is described in connection with clutch-temperature Y1 estimation processing, the clutch temperature Y1 depends on the instantaneous heat generation amount $\Delta Q$ of the clutch plates and the oil temperature f.

If the idle-stop time is longer, the time required for cooling the forward clutch 5 can be secured. However, if the idle-stop time is shorter, the clutch temperature Y1 cannot be reduced, so that even if the heat resisting performance can be secured in terms of the clutch temperature Y1, the amount of heat stored in the clutch plates is greater.

When the clutch temperature Y1 is smaller, the amount of heat of the clutch plates themselves raises no particular problem. However, when the clutch temperature Y1 is greater than the second set value B which is roughly equal to the given value Yo, the amount of heat stored in the clutch plates themselves becomes greater, leading to possible degradation of the heat resisting performance. Thus, when the clutch temperature Y1 is greater than the second set value B, transmission of an idle-stop permission signal is prohibited to prohibit next idle stop. With this, the engagement frequency can be reduced to secure the heat resisting performance of the forward clutch 5.

When the clutch temperature Y1 is equal to or greater than the first set value A and equal to or smaller than the second set value B, output of an idle-stop permission signal is prohibited for a predetermined time (idle-stop prohibition time t1) in view of securing the time required for cooling the clutch plates of the forward clutch 5. At that time, the idle-stop prohibition time t1 is set based on in which position the clutch temperature Y1 is situated in the relationship between the first and second set values A, B. Specifically, a prohibition-time coefficient $\alpha'$ is calculated in accordance with the equation:

$$\alpha'=(Y1A)/(BA)$$

The prohibition-time coefficient α' represents a degree of excess of the clutch temperature Y1 over the first set value A at which a reduction in heat resisting performance may not occur, and a degree of allowance of the clutch temperature Y1 with respect to the second set value B.

Setting of the idle-stop prohibition time t1 using the prohibition-time coefficient α' is achieved by the same structure as the prohibition-time map shown in FIG. 6. Specifically, since the cooling time differs according to not only the clutch temperature Y1, but also the conditions of the oil temperature f, the prohibition-time characteristics are set for oil temperatures so that the idle-stop prohibition time t1 is longer as the oil temperature f is higher. Even if the clutch temperature Y1 is greater, when the oil temperature f is lower, the idle-stop prohibition time t1 is set to be shorter. On the other hand, even if the clutch temperature Y1 is smaller, when the oil temperature f is higher, the idle-stop prohibition time t1 is set to be longer. With this, the heat resisting performance can be secured while securing the fuel-economy performance due to idle stop.

As described above, the system for controlling an idle-stop vehicle in the second embodiment can produce the following effects:

(1) The temperature Y1 of the forward clutch 5 is estimated at engine restart after idle stop. If the clutch temperature Y1 is smaller than the first set value A, next idle stop is permitted. If the clutch temperature Y1 is equal to or greater than the first set value A and equal to or smaller than the second set value B, next idle stop is permitted after a lapse of predetermined time t0. And if the clutch temperature Y1 is greater than the second set value B, next idle stop is prohibited. With this, the heat resisting performance can be secured. Moreover, in the second embodiment, the clutch temperature Y1 is estimated based on the heat generation amount and the oil temperature f, allowing more accurate estimation of the state of the forward clutch 5, resulting in further enhancement in heat resisting performance.

(2) The first set value A is set at a value which is smaller than a clutch temperature based on a variation minimum value (worst condition) of the heat generation amount Q occurring at least at full-throttle start, heat capacity C, and heat radiation gain k, and the second set value B is set at given value Yo which ensures the engagement frequency of the forward clutch 5. With this, even if the forward clutch 5 has manufacturing variation and the like, the heat resisting performance can be secured. Moreover, if there is uncertainty about heat resisting performance, idle stop is prohibited to allow reduction in engagement frequency. In the second embodiment, the second set value B is set at the same value as the given value Yo. Optionally, the second set value B may be set at a value larger than the given value Yo. The reason is that setting of the idle-stop prohibition time t1 allows the cooling time to be secured, and thus the heating resisting performance can be enhanced as compared with when setting no idle-stop prohibition time t1. With this, idle stop can be carried out positively, resulting in enhancement in fuel economy.

(3) The idle-stop prohibition time t1 is determined based on a ratio of a difference between the clutch temperature Y1 and the first set value A to a difference between the first set value A and the second set value B. With this, the idle-stop prohibition time t1 can finely be set in accordance with the clutch temperature Y1, so that the heat resisting performance can be secured while securing the fuel-economy performance due to idle stop.

(4) The idle-stop prohibition time t1 is determined based on the oil temperature f. Thus, even if the clutch temperature Y1 is greater, when the oil temperature f is lower, a reduction of the idle-stop prohibition time t1 allows the fuel-economy performance to be secured due to idle stop. Moreover, even if the clutch temperature Y1 is smaller, when the oil temperature f is higher, an increase of the idle-stop prohibition time t1 allows the heat resisting performance to be secured.

(5) The clutch temperature Y1 is estimated instantaneous heat generation amount ΔQ estimated based on the engine speed Ne, turbine speed Nt, and output-shaft rotating speed No, and the oil temperature f in the automatic transmission 4, resulting in possible accurate estimation without arranging any additional sensor and the like.

Having described the present invention in connection with the preferred embodiments, it is noted that the present invention is not limited thereto, and various changes and modifications can be made without departing from the scope of the present invention.

The entire teachings of Japanese Patent Application 2004-203450 filed Jul. 9, 2004 are hereby incorporated by reference.

What is claimed is:

1. A system for controlling an idle-stop vehicle, comprising:
   a hydraulic source;
   a forward clutch which is engaged through the hydraulic source; and
   an electronic control unit (ECU) which carries out an idle stop for stopping an engine when idle-stop permission conditions are established, the ECU carrying out an engine restart and an engagement of the forward clutch when idle-stop release conditions are established after an engine stop, the ECU being so programmed as to:
   estimate a heat generation amount of the forward clutch at the engine restart after the idle stop,
   permit a next idle stop when the heat generation amount is smaller than a first set value,
   permit the next idle stop, after a lapse of a predetermined time, when the heat generation amount is equal to or greater than the first set value and equal to or smaller than a second set value which is greater than the first set value, and
   prohibit the next idle stop when the heat generation amount is greater than the second set value.

2. The system as claimed in claim 1, wherein the first set value is smaller than a variation minimum value of the heat generation amount occurring at least at a full-throttle start, and the second set value is greater than a value which ensures an engagement frequency of the forward clutch.

3. The system as claimed in claim 1, wherein the predetermined time is determined based on a ratio of a difference between the heat generation amount and the first set value to a difference between the first set value and the second set value.

4. The system as claimed in claim 1, wherein the predetermined time is determined based on a ratio of a difference between the heat generation amount and the first set value to a difference between the first set value and the second set value and an oil temperature.

5. The system as claimed in claim 1, wherein the heat generation amount is estimated based on an engine speed, a turbine speed, and an output-shaft rotating speed.

6. A method of controlling an idle-stop vehicle with a hydraulic source and a forward clutch which is engaged through the hydraulic source, the method comprising:
   carrying out an idle stop for stopping an engine when idle-stop permission conditions are established;

carrying out an engine restart and an engagement of the forward clutch when idle-stop release conditions are established after an engine stop;

estimating a heat generation amount of the forward clutch at the engine restart after the idle stop;

permitting a next idle stop when the heat generation amount is smaller than a first set value;

permitting the next idle stop, after a lapse of a predetermined time, when the heat generation amount is equal to or greater than the first set value and equal to or smaller than a second set value which is greater than the first set value; and prohibiting the next idle stop when the heat generation amount is greater than the second set value.

7. The method as claimed in claim 6, wherein the first set value is smaller than a variation minimum value of the heat generation amount occurring at least at a full-throttle start, and the second set value is greater than a value which ensures an engagement frequency of the forward clutch.

8. The method as claimed in claim 6, wherein the predetermined time is determined based on a ratio of a difference between the heat generation amount and the first set value to a difference between the first set value and the second set value.

9. The method as claimed in claim 6, wherein the predetermined time is determined based on a ratio of a difference between the heat generation amount and the first set value to a difference between the first set value and the second set value and an oil temperature.

10. The method as claimed in claim 6, wherein the heat generation amount is estimated based on an engine speed, a turbine speed, and an output-shaft rotating speed.

* * * * *